(12) United States Patent
Brehm et al.

(10) Patent No.: US 9,291,375 B2
(45) Date of Patent: Mar. 22, 2016

(54) THERMOELECTRIC HEAT EXCHANGER

(75) Inventors: Holger Brehm, Erdmannhausen (DE); Thomas Heckenberger, Leinfelden-Echterdingen (DE); Thomas Himmer, Reichenbach (DE); Rudolf Riedel, Pforzheim (DE)

(73) Assignee: MAHLE International GmbH, Stuttgart (DE)

( * ) Notice: Subject to any disclaimer, the term of this patent is extended or adjusted under 35 U.S.C. 154(b) by 719 days.

(21) Appl. No.: 13/525,634

(22) Filed: Jun. 18, 2012

(65) Prior Publication Data

US 2012/0312029 A1    Dec. 13, 2012

Related U.S. Application Data

(63) Continuation of application No. PCT/EP2010/068896, filed on Dec. 3, 2010.

(30) Foreign Application Priority Data

Dec. 16, 2009  (DE) .................... 10 2009 058 673

(51) Int. Cl.
*F25B 21/02* (2006.01)
*F25B 21/04* (2006.01)
(Continued)

(52) U.S. Cl.
CPC .............. *F25B 21/02* (2013.01); *F24H 3/0429* (2013.01); *F24H 3/0435* (2013.01); *F24H 3/06* (2013.01); *F24H 3/062* (2013.01); *F24H 3/081* (2013.01); *F24H 3/12* (2013.01); *F24H 9/1872* (2013.01); *F25B 21/04* (2013.01); *F28D 1/05366* (2013.01); *B60H 2001/2275* (2013.01); *F24F 5/0042* (2013.01); *F24H 2250/06* (2013.01)

(58) Field of Classification Search
CPC ......... F25B 21/02; F25B 21/04; H01L 35/30; F24F 5/0042; F24H 3/06; F24H 3/062; F24H 3/08; F24H 3/081
USPC .............................................. 62/3.2, 3.3, 3.7
See application file for complete search history.

(56) References Cited

U.S. PATENT DOCUMENTS 2,759,247 A * 8/1956 Grenell et al. ........... 29/890.047
3,940,591 A  2/1976 Ting
(Continued)

FOREIGN PATENT DOCUMENTS

DE    32 08 802    9/1983
DE    199 22 668   11/2000
(Continued)

*Primary Examiner* — Frantz Jules
*Assistant Examiner* — Keith Raymond
(74) *Attorney, Agent, or Firm* — Muncy, Geisssler, Olds & Lowe, P.C.

(57) ABSTRACT

A thermoelectric heat exchanger for heating or cooling a medium, that includes at least one first tube for carrying a first medium and at least one second tube for carrying the first medium. The second tube being arranged substantially parallel to the first tube. The thermoelectric heat exchanger also has a casing element that is interposed between the first and the second tube, the casing element comprising a first casing part that is connectable to the first tube and at least one second casing part that forms a fluid channel for a second medium. A thermoelectric element for heating or cooling the first or second medium is interposed between the first and second casing part, the thermoelectric element being closed relative to the first and/or the second medium in a fluid-tight manner via the casing element.

8 Claims, 23 Drawing Sheets

(51) Int. Cl.
*F24H 3/06* (2006.01)
*F24H 3/04* (2006.01)
*F24H 3/08* (2006.01)
*F24H 3/12* (2006.01)
*F24H 9/18* (2006.01)
*F28D 1/053* (2006.01)
*B60H 1/22* (2006.01)
*F24F 5/00* (2006.01)

(56) References Cited

U.S. PATENT DOCUMENTS

| | | | |
|---|---|---|---|
| 3,996,447 A | 12/1976 | Bouffard et al. | |
| 4,065,936 A * | 1/1978 | Fenton et al. | 62/3.3 |
| 4,400,948 A * | 8/1983 | Moorehead | 62/3.3 |
| 5,119,640 A * | 6/1992 | Conrad | 62/272 |
| 5,737,923 A * | 4/1998 | Gilley et al. | 62/3.7 |
| 6,345,506 B1 * | 2/2002 | Kontani et al. | 62/3.2 |
| 6,557,354 B1 * | 5/2003 | Chu et al. | 62/3.2 |
| 7,098,429 B2 | 8/2006 | Angermann et al. | |
| 7,788,933 B2 * | 9/2010 | Goenka | 62/3.7 |
| 2003/0172657 A1 * | 9/2003 | Ohkubo et al. | 62/3.3 |
| 2006/0131007 A1 * | 6/2006 | Nies | B29C 65/46 165/152 |
| 2006/0157102 A1 * | 7/2006 | Nakajima et al. | 136/205 |
| 2006/0157225 A1 * | 7/2006 | Martin et al. | 165/80.4 |
| 2008/0028768 A1 * | 2/2008 | Goenka | 62/3.2 |

FOREIGN PATENT DOCUMENTS

| | | | |
|---|---|---|---|
| DE | 102 21 967 | 11/2003 | |
| EP | 0 340 361 | 11/1989 | |
| EP | 0 368 206 | 5/1990 | |
| EP | 2192372 A2 * | 6/2010 | 62/3.1 |
| EP | 2 230 701 | 9/2010 | |
| FR | 2 165 943 | 8/1973 | |
| FR | 27 93 546 | 11/2000 | |
| GB | 2 090 710 | 7/1982 | |
| WO | WO 92/06 570 | 4/1992 | |

* cited by examiner

THERMOELECTRIC HEAT EXCHANGER

This nonprovisional application is a continuation of International Application No. PCT/EP2010/068896, which was filed on Dec. 3, 2010, and which claims priority to German Patent Application No. DE 10 2009 058 673.3, which was filed in Germany on Dec. 16, 2009, and which are both herein incorporated by reference.

BACKGROUND OF THE INVENTION

1. Field of the Invention

The present invention relates to a thermoelectric heat exchanger.

2. Description of the Background Art

Particularly in hybrid vehicles or battery-driven electric vehicles, conventional coolant-fed heaters can no longer be used for heating the passenger cell, since the correspondingly high and necessary coolant temperatures which occur in a vehicle having an internal combustion engine are no longer available. The interior should therefore be heated using an electrically fed heater. Since the existing stored electric energy must be used as economically as possible, heating devices of this type should operate as efficiently as possible.

The heaters used in the conventional art (for example, in DE 10 2009 016 363) have the disadvantage that only low COP values are permitted and these heaters are thus not very efficient. At the same time, conventional heaters require a large installation space and are very heavy. In addition, conventional heaters are still very costly to operate and/or to manufacture.

A means of generating thermal energy from electric energy and thus to heat or cool the passenger compartment must therefore be provided, particularly for vehicles. It should be possible to situate the installation location of a heater or cooler of this type centrally (e.g., in the air conditioning system) or locally (for example, in air vents or seats).

SUMMARY OF THE INVENTION

It is therefore an object of the present invention to provide an improved heat exchanger.

In an embodiment, the present invention provides a thermoelectric heat exchanger for heating or cooling a medium, whereby the thermoelectric heat exchanger includes at least one first tube for carrying a first medium; at least one second tube for carrying the first medium, the second tube being disposed largely parallel to the first tube; and a casing element which is disposed between the first and second tubes, the casing element having a first casing part which is connected to the first tube, and the casing element furthermore having at least one second casing part which forms a fluid channel for a second medium, a thermoelectric element for heating or cooling the first or second medium being disposed between the first and second casing parts, and the thermoelectric element being sealed fluid-tight against the first and/or second medium by the casing element.

The present invention is based on the finding that COP values of greater than 1 may be achieved using thermoelectric elements, in contrast to electric heaters (resistance heating) which are equipped only, for example, with PTC elements. Using the appropriate polarity of the thermoelectric elements, the system may also be used, for example, to cool the cabin air. In a configuration including the first and second tubes, which carry the first medium, and a casing element disposed therebetween, which forms a fluid channel for the second medium, a large heat exchange surface may be provided for heating or cooling the first or second medium. The thermoelectric element is favorably encapsulated or sealed fluid-tight against the first and/or second medium. In this manner, for example, the second medium may be brought to a higher temperature than the first medium, with the aid of the thermoelectric element, the temperature of the first medium being used as the starting variable for the temperature increase of the second medium by means of the thermoelectric element. The second medium may also be brought to a lower temperature than the first medium if a correspondingly reversed polarity of the thermoelectric element is used, compared to the application scenario described above. In this case, the temperature of the second medium is used as the output variable for the temperature reduction by the thermoelectric element.

The present invention provides the advantage that either a heating function or a cooling function may now be implemented by the thermoelectric heat exchanger by applying a corresponding polarity to the thermoelectric element. The temperature of the other medium to be heated or to be cooled is used as the basis for the corresponding temperature increase or temperature reduction.

According to an embodiment of the invention, the second casing part may have a plurality of openings, in particular oblong holes, which form the fluid channel for the second medium. Such a specific embodiment of the present invention offers the advantage of a particularly good thermal contact between the second medium and the thermoelectric element, since the second medium flows all the way through the second casing part, and a good heat transfer from the second medium to the second casing part or from the second casing part to the second medium is thus ensured.

The second casing part may also have two part elements which mesh with each other in a comb-like manner and which favorably do not touch each other, and between which the fluid channel for the second medium is provided. Such a specific embodiment of the present invention permits a vary large heat transfer surface to be implemented in the fluid channel, so that an effective heat transfer between the second casing part and the second medium is enabled.

In another embodiment of the present invention, the first tube may have at least one recess which permits a direct contact between the first medium and the first casing part when the first medium flows through the first tube. Such a specific embodiment of the present invention offers the advantage that a very good heat transfer coefficient between the first casing part and the first medium is ensured by the direct contact between the first medium and the first casing part.

In another embodiment of the present invention, the casing element may furthermore have a third casing part which is connected to the second tube, another thermoelectric element being disposed between the third casing part and the second casing part, and the additional thermoelectric element furthermore being sealed fluid-tight against the first and second media. Such a specific embodiment of the present invention offers the advantage that the temperature of the second medium may also be influenced by the second thermoelectric element. This control is carried out from one side of the second tube, in which a portion of the first medium also flows, so that the second medium in the fluid channel of the second casing part may be brought more quickly to the desired setpoint temperature by means of a configuration of this type.

In still another embodiment of the invention, the casing element may furthermore have at least one casing part which is made of a ceramic material and/or has a coating which contains a ceramic material. Such a specific embodiment of the present invention offers the advantage that an expansion or deformation of the corresponding casing part may be minimized depending on the material, even if there are major temperature changes due to the thermoelectric element.

To minimize the manufacturing costs of the thermoelectric heat exchanger, the casing element may have at least one casing part which is manufactured from a plastic material.

It is particularly favorable for a high heat transfer coefficient from the casing part to the first and/or second medium if the second casing part has a ribbing which is manufactured from a metallic material.

In an embodiment of the invention, the ribbing may have upward bends which are embedded in another material of the second casing part. Such a specific embodiment of the present invention offers the advantage that, on the one hand, a cost-effective material such as a plastic may be used for the second casing part, while a high heat transfer coefficient may simultaneously be provided for transferring heat or cold to the second medium.

The casing element may also have a heat exchange region in which an exchange of heat between the first medium and the second medium is enabled without intervention by the thermoelectric element. Such a specific embodiment of the present invention offers the advantage that, if a higher temperature difference exists between the first and second media, this temperature difference may be reduced in the heat exchange region (i.e., the temperatures of the first and second media converge), without electric energy having to be applied in the thermoelectric element for this purpose. The fact that the thermoelectric element uses primarily electric energy to increase or reduce the temperature of the medium to be heated or cooled beyond the temperature of the medium used as the starting may thus be easily ensured.

It should also be noted that thermoelectric elements themselves may often be quite expensive. In order to further increase a temperature of one of the two media, using a component which is economical to manufacture, in addition to the aforementioned specific embodiments, the casing element may have a heating region which includes at least one embedded heating element, in particular at least one PTC element, in another specific embodiment of the present invention. An increase in the temperature of the first medium in the first tube or an increase of the second medium in the fluid channel may thus be achieved in the heating region, with the aid of the at least one heating element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
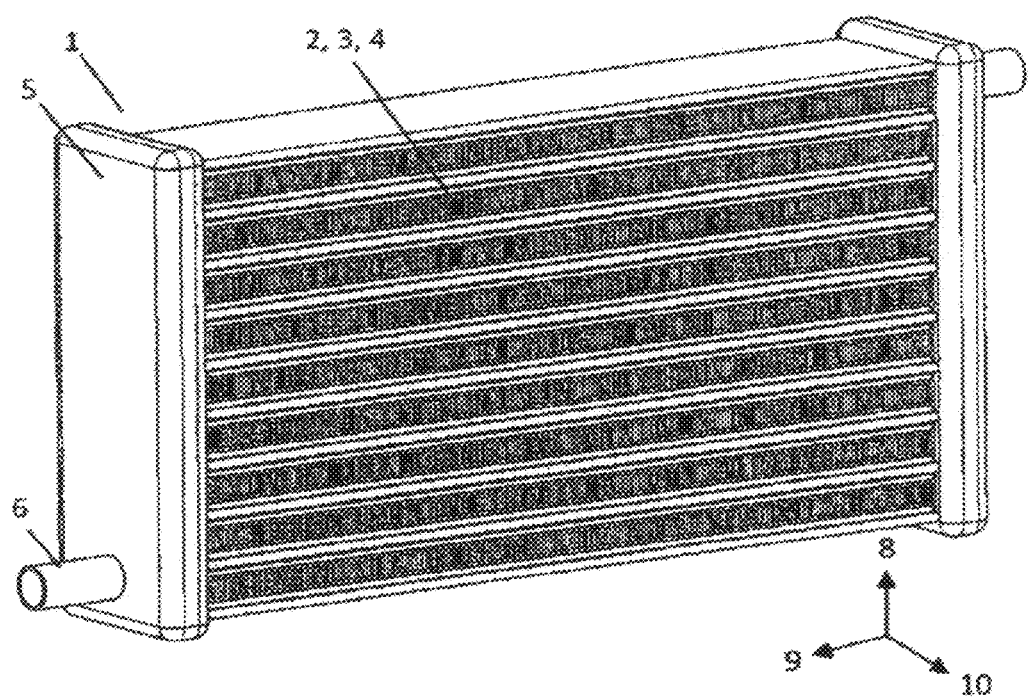
FIG. 1 shows an isometric representation of a thermoelectric heat exchanger (TE-HC)

In the following description of the exemplary embodiments of the present invention, identical or similar reference numerals are used for the elements illustrated in the different drawings and having a similar function, these elements not being described repeatedly. The exemplary embodiments described have been selected only by way of example and may be combined with each other.

FIG. 1 shows a thermoelectric heat exchanger (1), which may also be referred to as a thermoelectric heater and cooler (TE-HC). The TE-HC is a heat exchanger which is equipped with thermoelectric (TE) modules (TEM), which, in turn, include thermoelectrically active materials. If the TEMs are operating using electricity, the TE-HC may be used as a heater and as a cooler, since the two opposite main surfaces of the TEMs are in contact with a heat source in the form of the first medium (e.g., coolant or air), on the one hand, and with a heat sink in the form of the second medium (e.g., air or coolant), on the other hand. The TEMs remove heat from the one medium and transport it to the other medium (heat pump or Peltier effect). The media are conducted past each other accordingly within the TE-HC. The present description is aimed, in particular, at the type of connection between the TEMs and the heat exchanger as well as the design thereof.

TE-HC 1 illustrated in FIG. 1 largely comprises the following components: tubes 2, thermoelectric modules TEM 3, a ribbing 4, a collecting tube 5, connecting flanges/connectors/lines 6 and possibly turbulence inserts 7 (which are not illustrated in FIG. 1).

TE-HC 1 illustrated herein (i.e., the thermoelectric heater and cooler) is illustrated isometrically in FIG. 1. Its design represents a cross-flow radiator heat exchanger, from a structural, thermodynamic perspective. Conversely, TE-HC 1 may also be used as a thermoelectric generator (TEG=thermoelectric generator), in which case a sufficiently large temperature difference should be present at TEM 3.

The thermoelectric generator (TEG) described in the publication DE 10 2009 016 363.8 may also be used as TE-HC 1, in which case TEM 3 included therein not being used for power generation but, conversely, being operated by electricity in order to achieve a heating or cooling effect.

Figure 2:
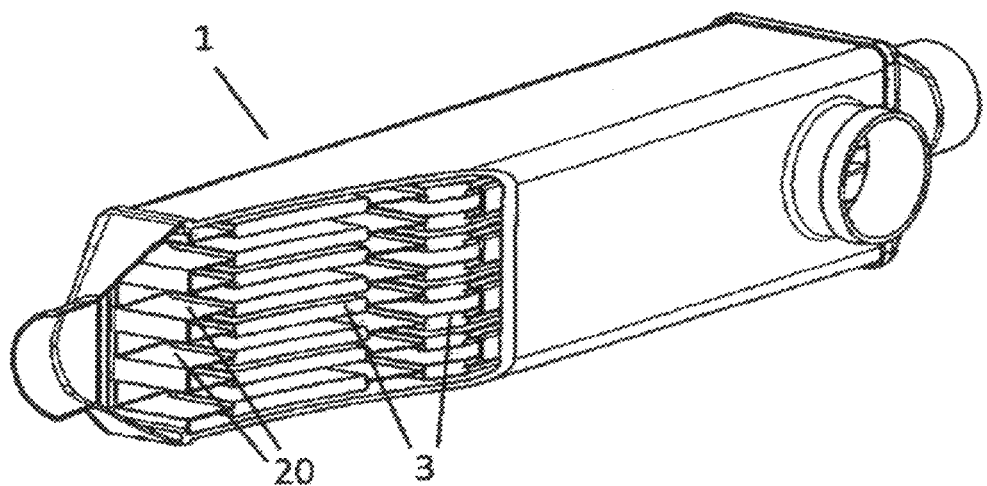
FIG. 2 shows an isometric representation of a thermoelectric heat exchanger or thermoelectric generator (TEG) in a longitudinal sectional view, according to the prior art.

FIG. 2 shows a general isometric representation of a longitudinal section of a TE-HC/TEG 1 according to the apparatus described in the publication DE 10 2009 016 363.8.

The operation of a TE-HC 1 may be generally described as follows:

In TE-HC 1, two media 11, 12 having the same or different temperature are conducted past each other in a cross flow along a transfer route 8, 9, 10, which is designed to have power-operated TEMs 3, causing heat to be transported from one medium 11, 12 to the other or causing the heat to be "pumped" from one side 11, 12 to the other. The two media 11, 12 are separated by TEMs 3 and/or tubes 2, so that they do not mix with each other. One of media 11, 12 flows in tubes 2. One medium 12 is, for example, supply air or circulating air, while other medium 11 is, for example, a water/Glysantin mixture (coolant). Air 12 is taken, for example, from the vehicle interior or the surroundings, while water/Glysantin mixture 11 is taken from a coolant circuit for cooling/heating different engine, air conditioning or battery components.

Figure 3:
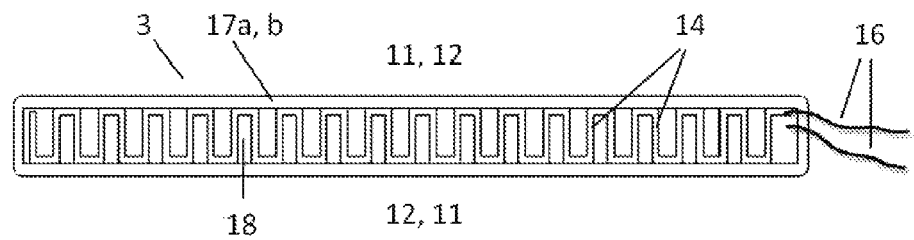
FIG. 3 shows a general sketch of a thermoelectric module in a cross-sectional view.
Figure 4:
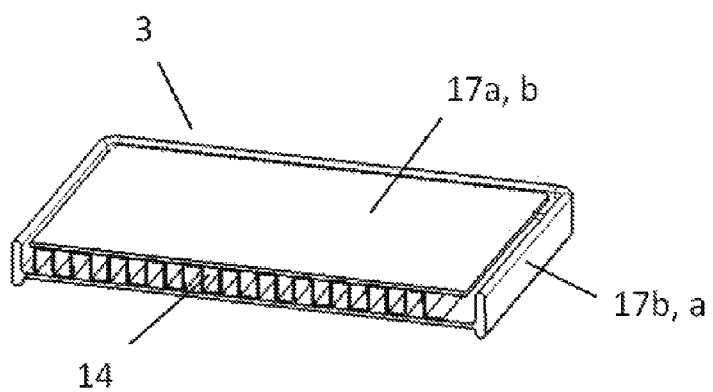
FIG. 4 shows a general sketch of an isometric representation of an exemplary embodiment of a TEM in a sectional view.

FIG. 3 shows a sectional view of a basic configuration of components of a TEM 3. TEM 3 largely comprises the following main components as standard: TE-active materials 14, e.g., semiconductors, electric conductors 15, a connecting cable 16. FIG. 4 shows a general sketch of an isometric representation of an exemplary TEM embodiment.

TEM 3 optionally includes the following additional components: at least one (ribbed) casing 17 and/or a filler in space 18 between the thermoelectric materials.

The operation of a TEM 3 may be generally described as follows:

On the outside of TEM 3, a heat source is present on one side 11, 12 and a heat sink is present on other side 12, 11, causing heat to be transported from one side 11, 12 to other side 12, 11 on the basis of the current which is present, thus producing a change in temperature of the two media 11-12. A generation of heat within TE-HC 1/TEM 3 may be carried out as follows:

The separating plane/surface between one side 11, 12 and the other side 11, 12 is represented primarily by thermoelectric module TEM 3. This means that one side 11, 12 of TEM 3 is in direct or indirect contact with first medium 11, and the other side 12, 11 is in direct or indirect contact with second medium 12. [Due to] the electron and positive hole migration initiated by the electric current within thermoelectrically active materials 14 (e.g., semiconductor materials) of TEM 3, heat is removed from one side 11, 12 and supplied to the other side 12, 11 (Peltier effect). The heat transport process intensifies the electron and positive hole migration even further, but must be maintained by an electric voltage applied to TEM 3. This produces a temperature difference 11-12 between the one side 11-12 and other side 11-12 of TEM 3. The electric current is taken, for example, from an electric storage unit (e.g., battery) and supplied via electric cables 16, which lead to or into TEM 3 and are connected thereto.

Figure 5:
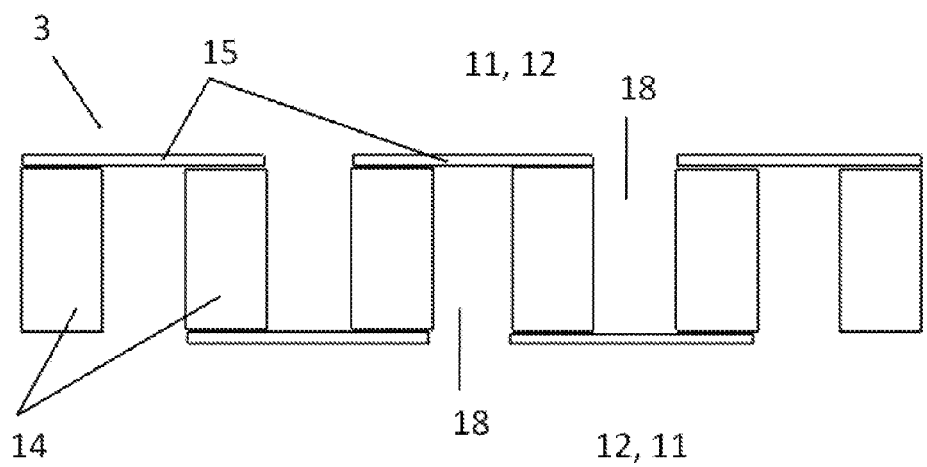
FIG. 5 shows a section of a basic TEM in a cross-sectional view.
Figure 6:
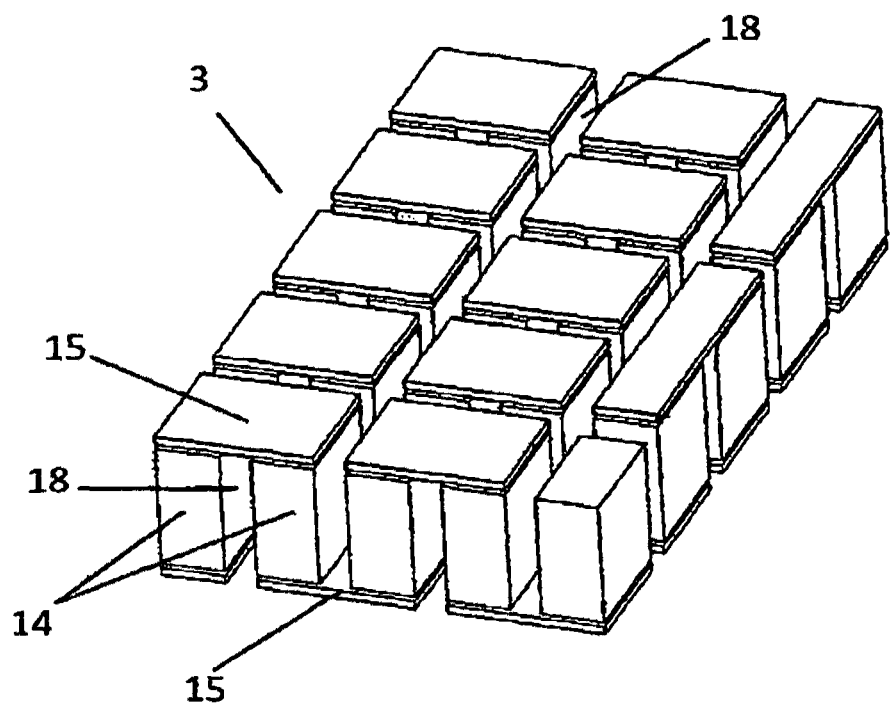
FIG. 6 shows an isometric representation of a section of a basic TEM.

TEM 3 is constructed as illustrated, for example, according to FIG. 5 or FIG. 6. A plurality of thermoelectrically active materials 14 (e.g., n-doped and p-doped semiconductors) are connected to each other alternatingly in TEM 3 via electric conductors 15. The geometric orientation of thermoelectrically (TE) active materials 14 is in the direction of the heat flow from the side 11, 12 to other side 12, 11. PbTe or BiTe may be used, for example, as the material of TE-active materials 14.

TE-active materials 14 do not touch each other, for which reason a space 18 is provided between TE-active materials 14. For reasons of efficiency, the ratio between the volume of TE-active materials 14 and the volume of space 18 should, in principle, be as high as possible.

To set the desired electric voltages and current flows, TEM 3-internal 13 semiconductor 14 conductor materials 15 may be connected in a row or in parallel. This also applies to the electric interconnection of multiple TEMs 3.

TEM 3 itself may be designed, for example, as described in DE 10 2009 016 363. TEMs 3 described therein are used in the exemplary embodiment described above not only as power generators but also as heaters and coolers. Additional specific embodiments of TEMs 3 are described in greater detail below.

Figure 7:
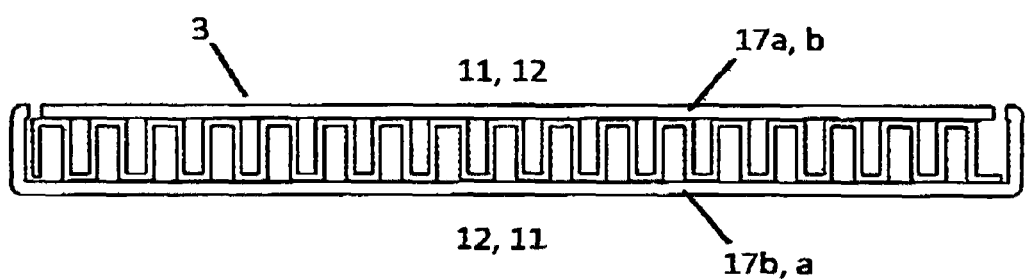
FIG. 7 shows a general sketch of a TEM casing in a cross-sectional view.

A general casing 17 of TEM 3 is first provided, as illustrated in a two-part design in FIGS. 7 (17a and 17b). Thermoelectrically active materials 14 and conductor materials 15 may be electrically insulated toward the outside 11, 12. For this purpose, TEM 3 is surrounded by an electrically insulating casing layer 17 on all sides 11, 12, . . . . This casing layer, or casing 17 (hereinafter also referred to synonymously as casing element) surrounds a TEM 3 and also protects the internal electric components 14, 15 from penetrating dirt as well as from moisture and, if necessary, liquids.

A ceramic material or a metallic material (high-grade steel, aluminum, copper, etc.) or a plastic is used, for example, as casing material 17. Casing 17 may have a single part, two part or multi-part design 17a, 17b. Casing parts 17 are connected to each other media-tight. This may be done by soldering, welding, gluing or using fillers (e.g., silicone).

FIG. 7 shows a general sketch of such a TEM casing 17 in a cross-sectional view.

Figure 8:
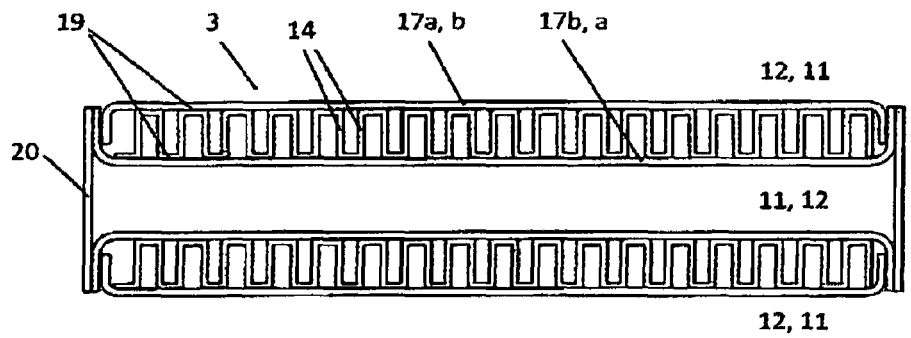
FIGS. 8-10 show representations of a TEM tube or TEM mounting in a cross-sectional view.
Figure 9:
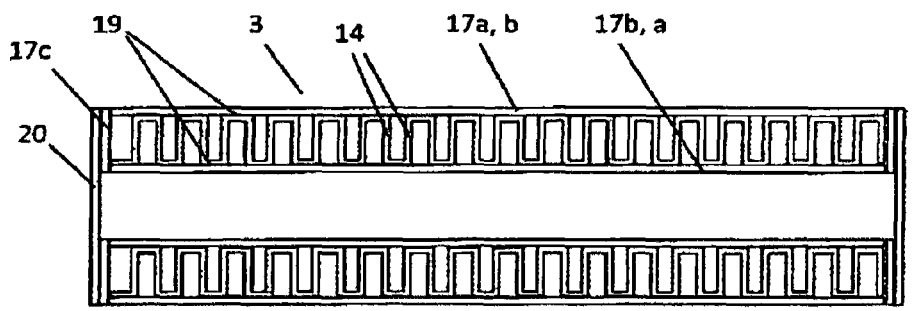
Figure 10:
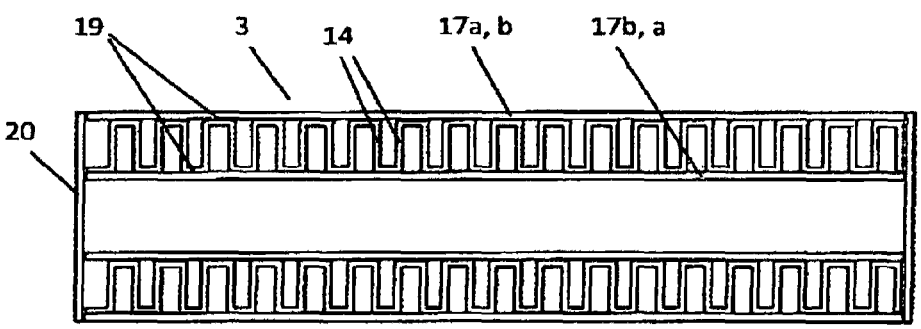

A casing 17 made of a high-grade steel or other metal should additionally have an electrically insulating layer 19 between thermoelectric semiconductor conductor material 14, 15 and the metal, as illustrated in FIGS. 8, 9 and 10. According to one exemplary embodiment of the present invention, this layer 19 is a ceramic coating 19. This layer may be applied, for example by thermal spraying or sputtering, or by another common coating method. A thin-walled ceramic sheet 19 or a ceramic film 19 or a ceramic green body 19 may also be soldered or sintered to metallic substrate 17.

Constructions of TEM 3, a TEM tube 2 or a TEM 3 mounting 20 may thus be provided, for example as illustrated in FIGS. 8 through 10. Metallic casing parts 17a and 17b are connected to each other and may be soldered or welded, preferably laser-welded. Mounting 20 is connected to metallic casing 17 and may be soldered or welded, preferably laser-welded, thereto, according to the invention. Mounting 20 is installed in a heat exchanger 1 (see FIG. 2, for example) and connected thereto.

General embodiment variants of TE-HC 1 may furthermore be described as follows:

TE-HC 1 may be installed in the vehicle in a vertical, horizontal or other installation position. It may be accommodated, for example, in an air conditioning system, an air vent, a vehicle seat or underneath the interior paneling of the vehicle. It may be operated air-to-air with the aid of media 11, 12 or preferably fluid-to-air with the aid of media 11, 12. According to the orientation in FIG. 1, any depth 10, height 9 or width 8 of TE-HC 1 may be selected, depending on the installation location, installation space and media 11, 12 used in each case.

Collecting tube 5 may be designed as follows:

TE-HC 1 has one collecting tube 5 (for example, according to FIG. 11) or two collecting tubes 5 (for example, according to FIG. 12), which combine first medium 11 before and/or after the heat exchange in TE-HC 1.

Collecting tubes 5 may communicate with connections 6 (e.g., flanges, hoses, cables, connectors), which carry first medium 11 to TE-HC 1 or away from TE-HC 1. Collecting tube 5 is equipped with a corresponding opening for this purpose. Collecting tube 5 and connections 6 are connected to each other media-tight.

Collecting tube 5 may have a one-part or multi-part design, for example including a cover and a base. Collecting tube 5 may be manufactured from an aluminum, copper or plastic material or from a combination of these materials (e.g., a first part 5a made of plastic, a second part 5b made of aluminum). Individual parts 5a, 5b are manufactured according to the material (e.g., extrusion, injection molding, stamping). According to the materials used, the parts of collecting tube 5a, 5b are joined together mechanically (e.g., by clamping) or integrally (e.g., by soldering or welding). In principle, collecting tube 5 may be provided in a standard design, as is common for conventional heating elements, coolant coolers or condensers in the vehicle.

Collecting tube 5 may also be designed to have a partition wall, which enables TE-HC 1 to be operated with multiple passages.

Figure 11:
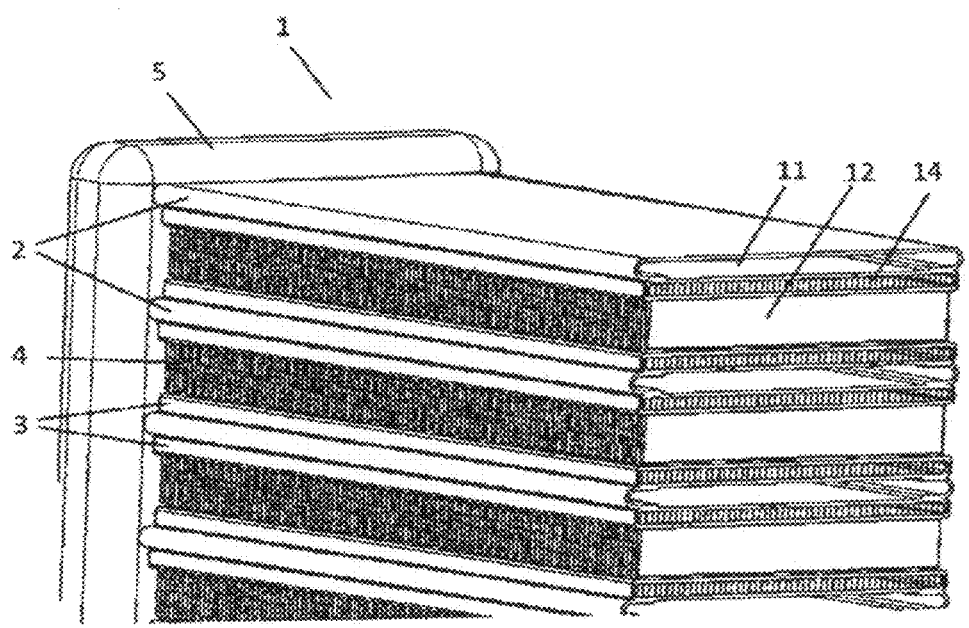
FIG. 11 shows an isometric representation of a section of a TE-HC in a sectional height view.

Collecting tube 5 communicates with a plurality of tubes 2 (see FIG. 11, for example). For this purpose, collecting tube 5 is equipped with a plurality of openings 21 (see FIG. 15, for example) which corresponds to one of tubes 2 and via which first medium 11 may be distributed from collecting tube 5 to tubes 2 or via which first medium 11 may be conducted from tubes 2 to collecting tube 5 and combined therein. Openings 21 are designed according to the shape of tube 2. Collecting tube 5 and tubes 2 are connected to each other media-tight.

In principle, tubes 2 may be provided in a standard design, as is common for conventional heating elements, coolant coolers, evaporators or condensers and gas coolers in the vehicle. Tubes 2 are preferably flat tubes 2 in this case. Any number of tubes 2 may be provided both in width direction 8 and in depth direction 10. In width direction 8 and/or depth direction 10, they are oriented largely parallel to each other and do not touch each other. First medium 11 flows in the interior of tube 2. Second medium 12 flows outside tubes 2. A basic configuration of tubes 2 of the heat exchanger is illustrated in FIGS. 11 through 15.

Tubes 2 may have webs on the inside 11, by means of which first medium 11 is distributed to multiple chambers in tube 2. The webs increase the stability of tube 2 and improve heat transport. Tubes 2 may also be ribbed or profiled on the inside.

An increase in the effectiveness of TE-HC 1 may also be achieved by inserting turbulence inserts 7, which are not illustrated in the figures, into the interior of tube 2.

Tube 2 is preferably manufactured from an aluminum or copper material, although it may also be made of a plastic, a ceramic or a corrosion-resistant steel.

Tubes 2 are fitted with or contacted to TEMs 3 on their outside, which is assigned to second medium 12. Tube 2, or the combination of tube 2 and TEMs 3, is designed to be media-tight toward the inside 11 as well as the outside 12. The outer shape of TEM 3 or casing 17 of TEM 3 is adapted to the shape of tube 2, so that TEM 3 is connected to tube 2 as much as possible and over the largest possible area on its side facing tube 2.

In the preferred flat tube design of tube 2, the planar, outer upper and lower sides of tube 2 are each fitted with TEMs 3, so that the upper and lower sides of the particular TEM 3 is contacted to tube 2, and the other side of TEM 3 is in contact with second medium 12. The first main surface of TEM 3 is thus assigned directly or indirectly to first medium 11, and the other main surface of TEM 3 is assigned primarily directly to second medium 12.

Tube 2 is largely fitted with one or multiple TEMs 2 over its entire length 9, so that the number of TEMs 3 corresponds, for example, at least to twice the number of tubes 2 of TE-HC 1.

Figure 13:
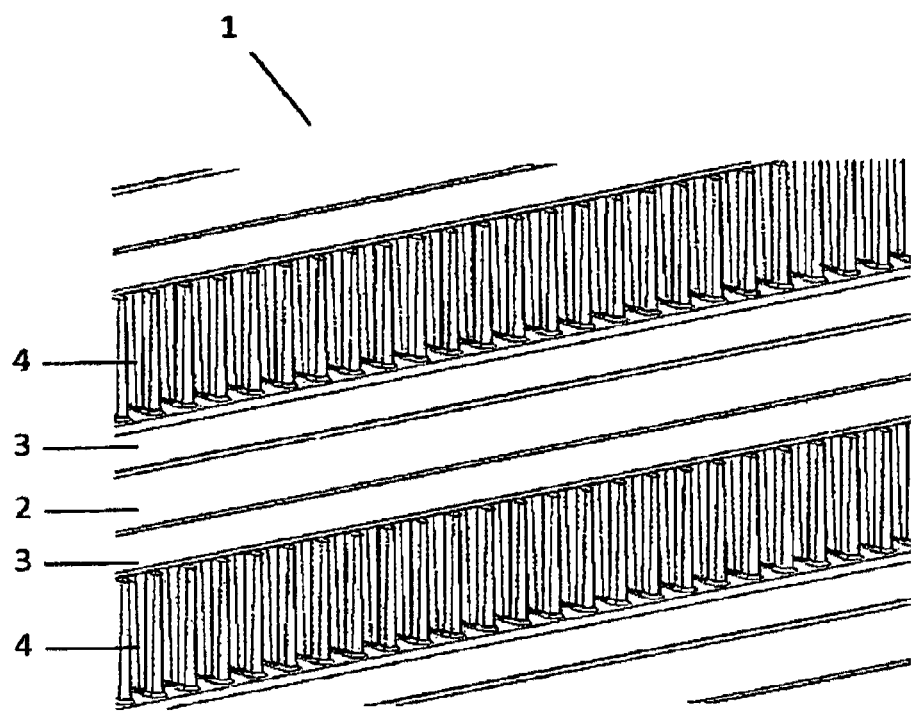
FIG. 13 shows an isometric representation of sections of a TE-HC.
Figure 14:
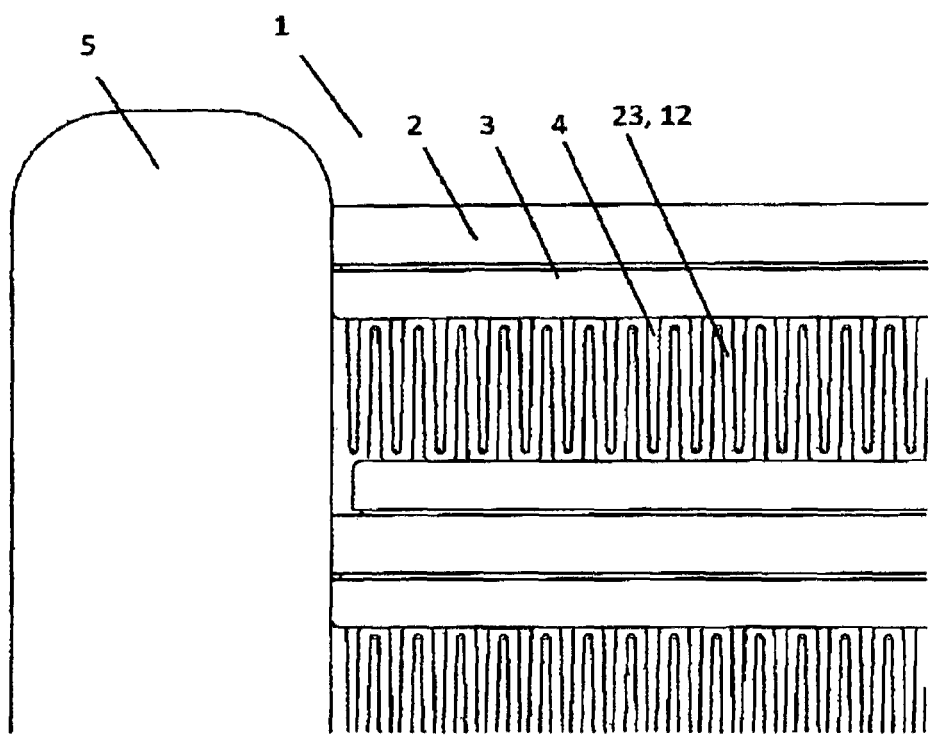
FIG. 14 shows a representation of a section of a TE-HC in a depth view from above.
Figure 15:
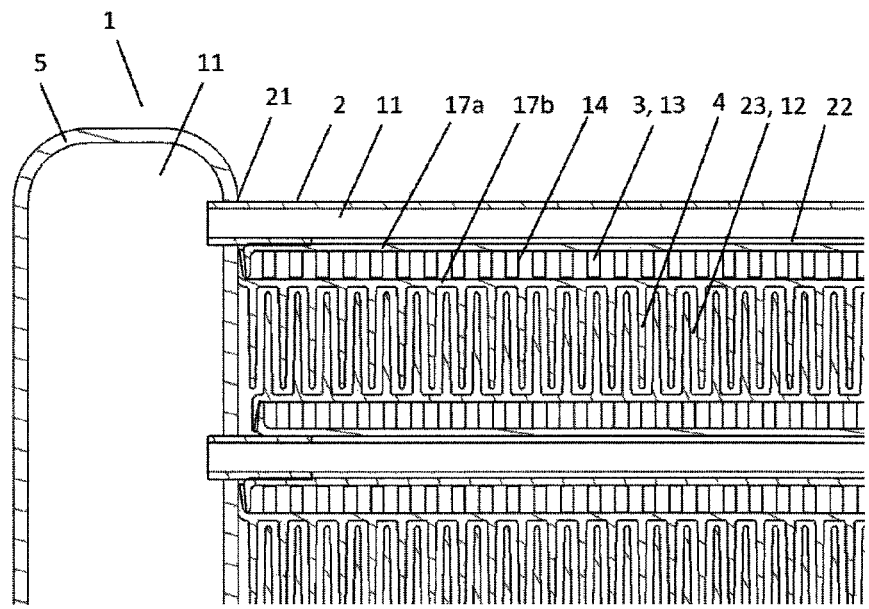
FIG. 15 shows a representation of a section of a TE-HC in a sectional depth view.
Figure 16:
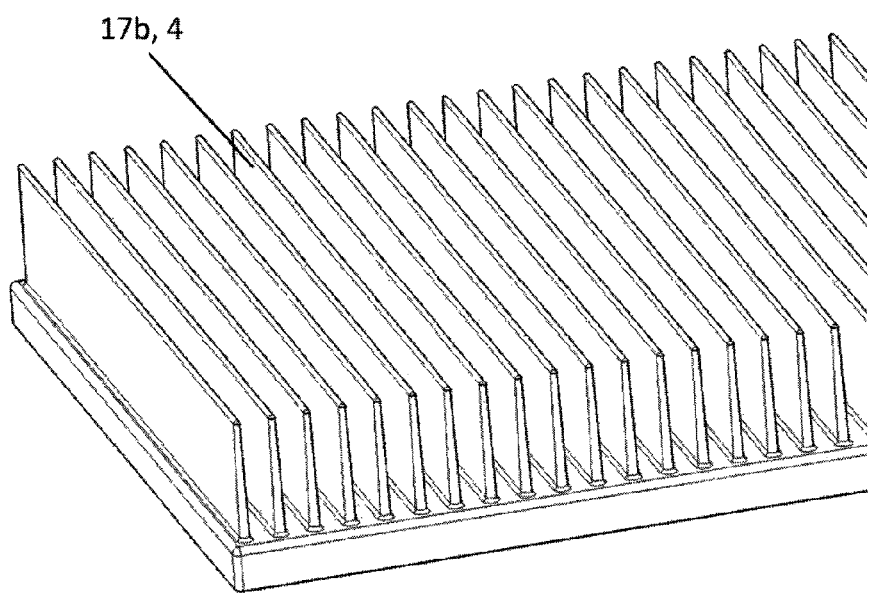
FIG. 16 shows an isometric representation of a section of a second, ribbed main casing part.
Figure 17:
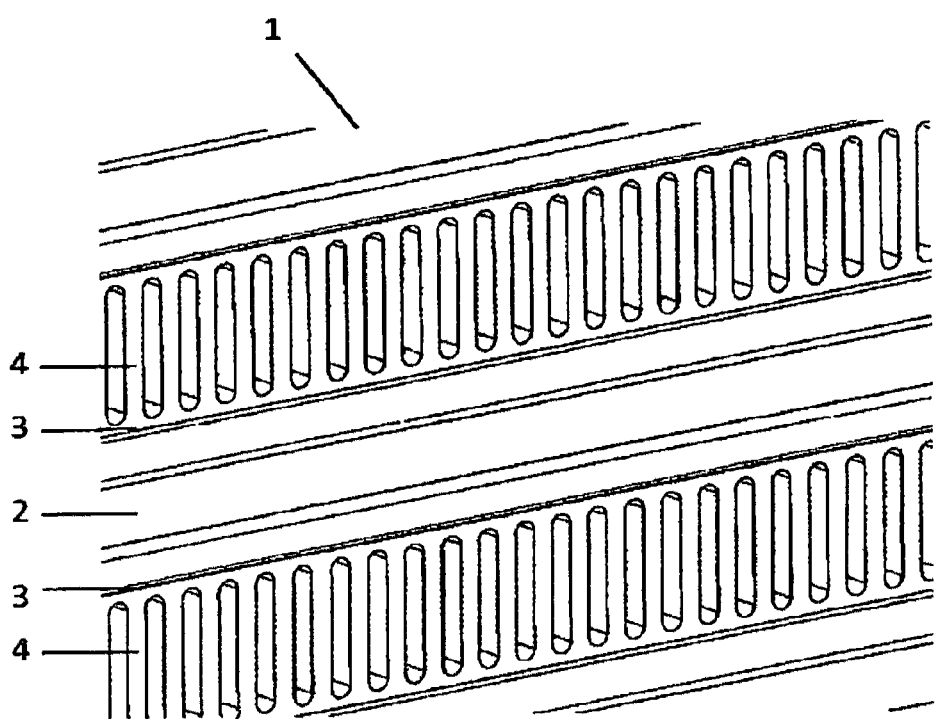
FIG. 17 shows an isometric representation of a section of a TE-HC.
Figure 18:
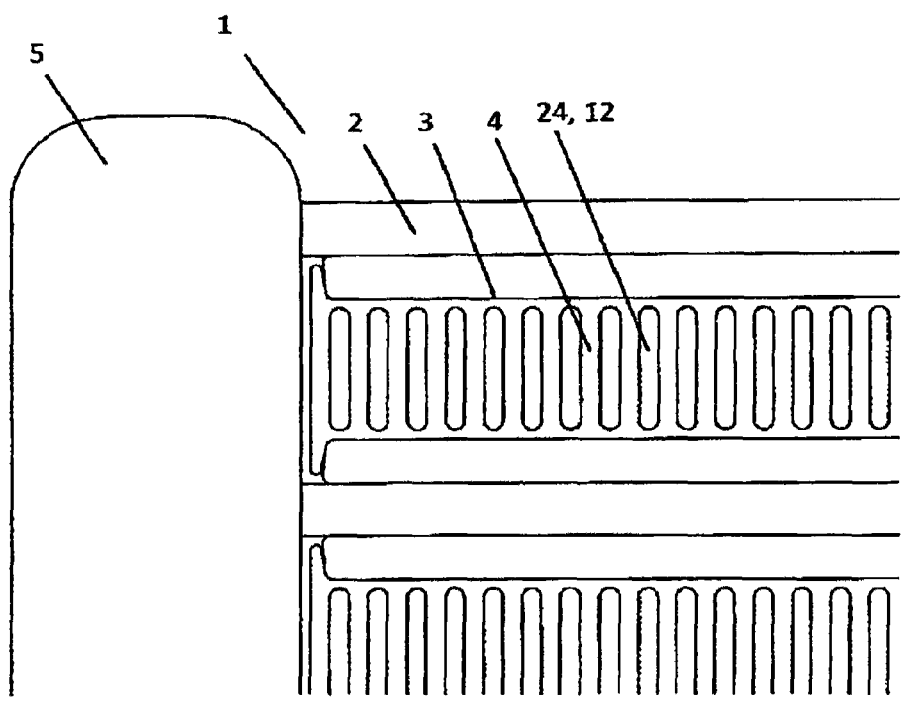
FIG. 18 shows a representation of a section of a TE-HC in a depth view from above.

Ribs 4, such as corrugated ribs or layered sheets, may be provided between two TEMs 3 on the outside in the material flow of second medium 12, it being possible to assign these ribs 4 separately as well as to TEM 3 itself. FIGS. 13, 14 and 15 show representations of exemplary embodiments in which casing 17 has ribs 4 of this type.

The connection between tube 2 and TEM 3 depends on the materials provided for tube 2 and casing 17 of TEM 3. A welding, soldering or gluing may therefore be provided. A force-fit or form-locked connection is also possible. The same applies to the connection between TEMs 3 and outer ribbing 4 (second medium 12), provided that ribbing 4 and TEMs 3 are not already materially cohesive and thus made from a single part.

If TEM 3 is in direct contact with first medium 11, a ribbing 4 may be provided on the main surface of TEM 3 facing first medium 11.

An embodiment variant of TE-HC 1 may furthermore be used in which a ceramic casing 17, in particular, is used for TEMs 3. Casing 17 of TEM 3 is then made of a two-part or multi-part ceramic material (e.g., aluminum oxide). One of the two main casing parts 17a or 17b is connected to tube 2, tube 2 being able to have one or more recesses 22, so that the first of the two main casing parts 17a is, on the one hand, partially in direct contact with first medium 11, which flows in the interior of tube 2, and, on the other hand, is connected at least partially to tube 2. Second main casing part 17b of TEM 3 on the other main side of TEM 3 faces second medium 12 and is in direct contact therewith. According to the representations in FIGS. 13 through 16, for example, this second main casing part 17b is profiled/ribbed 4 in such a way that ribbing 4 meshes in a toothed rack-like or comb-like manner with second main casing part 17b of an adjacent, diametrically opposed TEM 3, which is attached to the closest adjacent tube 2.

Gaps 23, through which a fluid channel is formed, through which second medium 12 may flow, are provided between alternating teeth/ribs 4 of the two main casing parts 17b of the two TEMs 3. The two second main casing parts 17b of the two TEMs 3 therefore do not touch each other.

TE-active materials 14 and associated conductor materials 15 are introduced within casing parts 17 of a TEM 3. Casing parts 17 are connected to each other media-tight. Casing parts 17 may be extruded, injection-molded or compression molded.

FIGS. 11 through 16 show exemplary embodiments of the aforementioned configurations.

According to another specific embodiment of the invention, casing 17 of TEM 3 may also be made of a two-part or multi-part ceramic material (e.g., aluminum oxide). For example, one of the two main casing parts 17a is connected to tube 2, tube 2 being able to have one or multiple recesses 22, so that the first of the two main casing parts 17a is, on the one hand, partially in direct contact with first medium 11, which flows in the interior of tube 2, and, on the other hand, is connected at least partially to tube 2. Second main casing part 17b of TEM 3 on the other main side of TEM 3 faces second medium 12 and is in direct contact therewith. This second casing part 17b is simultaneously assigned to another second TEM 3, which is located adjacent to first TEM 3 in width direction 8 and is diametrically opposed thereto, and this second TEM 3 is attached to closest adjacent tube 2 and thus also forms second main casing part 17b of this second TEM 3. In this embodiment variant according to FIGS. 17 through 20, second casing part 17b is provided with a plurality of openings 24 which penetrate casing part 17b in depth direction 10 and which are preferably designed in the shape of oblong holes, thereby ultimately creating a ribbing 4 of TEMs 3 associated with main casing part 17b. Second medium 12 flows through openings 24 in casing 17b.

TE-active materials 14 and associated conductor materials 15 are introduced within casing parts 17 of a TEM 3. Casing parts 17 are connected to each other media-tight. Casing parts 17 may be extruded, injection-molded or compression molded.

Figure 12:
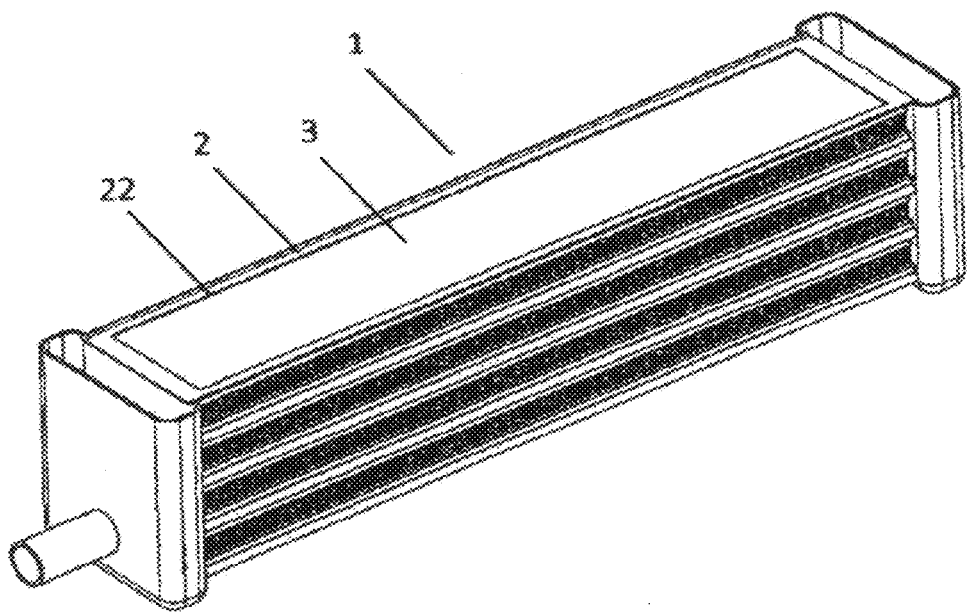
FIG. 12 shows an isometric representation of a TE-HC in a sectional width view.

This embodiment variant of the present invention may also be designed, in particular, according to FIGS. 11 and 12 as well as FIGS. 17 through 20.

Figure 21:
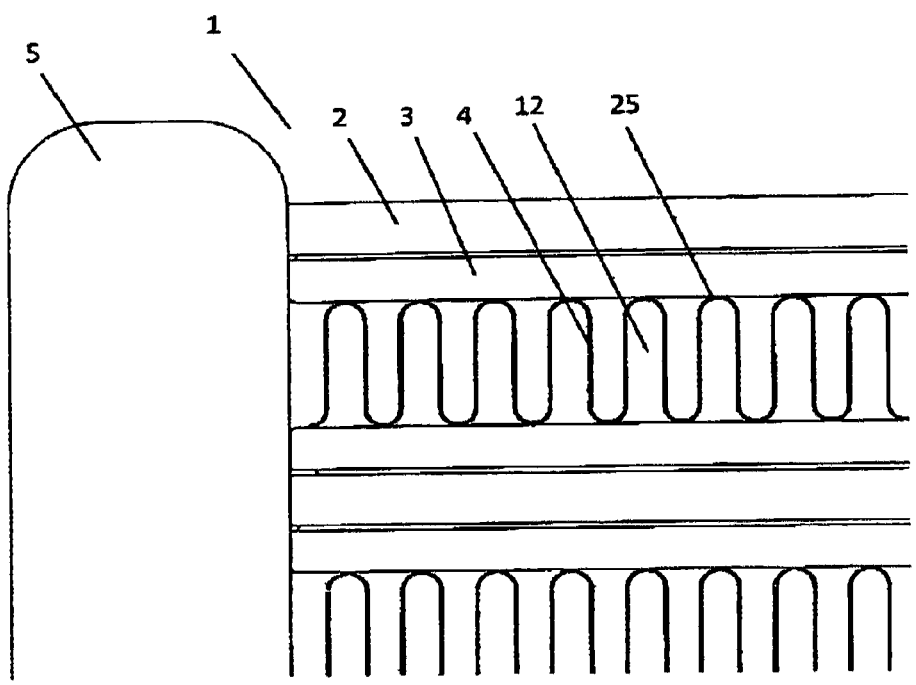
FIG. 21 shows a representation of a section of a TE-HC in a depth view from above.

According to another embodiment variant of the present invention, ribbing 4 of ceramic casing part 17b of TEM 3 may also be metallic, preferably a high temperature-resistant, high grade steel or a nickel-based material or an aluminum or copper alloy. FIG. 21 shows a sectional representation of an exemplary embodiment of this type in a depth view from above.

In an embodiment variant of this type, ribbing 4 may be integrally connected to ceramic casing part 17b of TEM 3 in the case of the sintering thereof by metallizing 25 the surface of the ceramic prior to sintering. In this design, metallization 25 itself represents ribbing 4, 25.

Alternatively, metallic ribbing 4 may be soldered onto the ceramic after the sintering thereof, in which case the ceramic substrate should also be metallized 25 on its surface ahead of time.

Ribbing 4 may be integrally assigned to one or two casing parts 17b of one or two TEMs 3.

Such an embodiment variant of the present invention described above may also be designed, in particular, according to FIGS. 11 and 12 as well as FIG. 21.

An embodiment variant of TE-HC 1 may furthermore be used in which a plastic casing 17 is used, in particular, for TEMs 3. Such embodiment variants of the present invention may be designed in the manner according to FIGS. 11 and 12 as well as 21 and 22 through 26.

Casing 17 of TEM 3 is then made of a two-part or multi-part plastic (e.g., PP or PA). In other respects, this variant corresponds to the embodiment of the first embodiment variant described with reference to FIGS. 11 through 16.

Casing parts 17 may be extruded or injection-molded. The plastic may include heat-conducting additives such as graphite, ceramic or metal powder.

Casing 17 of TEM 3 is made of a two-part or multi-part plastic (e.g., PP or PA). In other respects, this variant corresponds to the embodiment of the second embodiment variant described with reference to FIGS. 17 through 20.

TE-active materials 14 and associated conductor materials 15 are introduced within casing parts 17 of a TEM 3. Casing parts 17 are connected to each other media-tight. Casing parts 17 may be extruded, injection-molded or compression molded.

Figure 22:
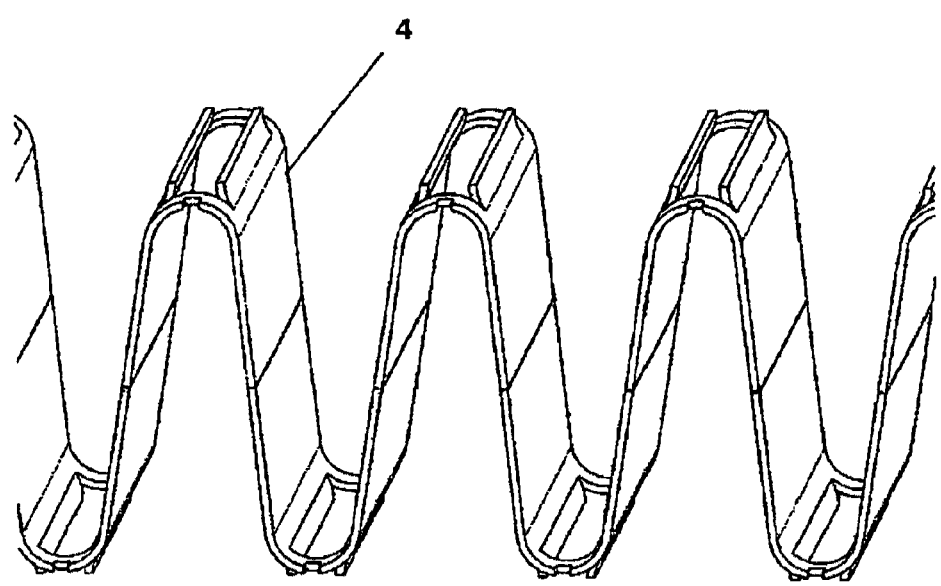
FIG. 22 shows an isometric representation of a metallic ribbing for a section of a plastic casing.
Figure 23:
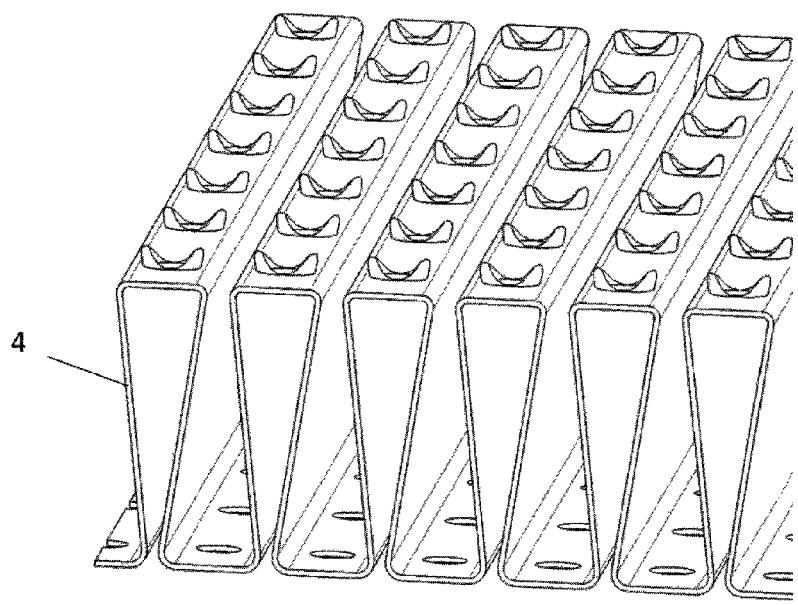
FIG. 23 shows an isometric representation of a metallic ribbing for a section of a plastic casing.
Figure 24:
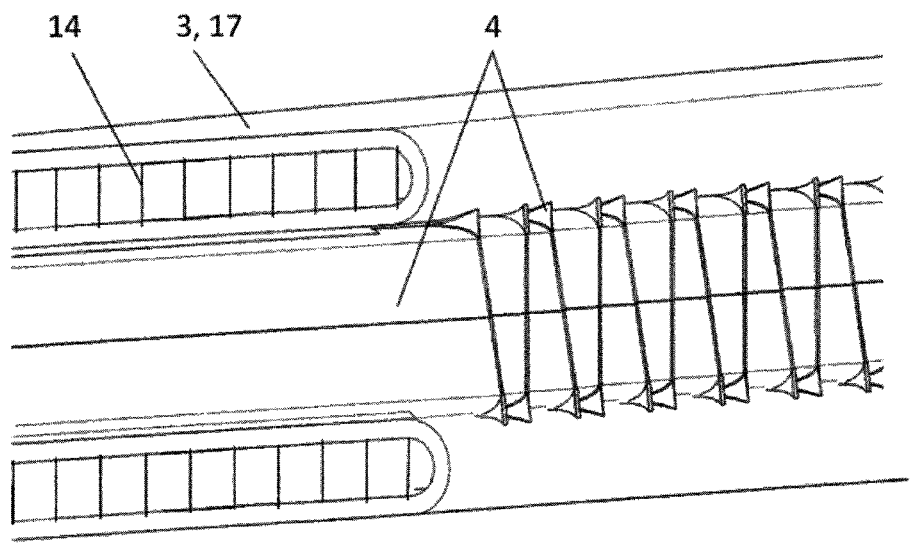
FIG. 24 shows an isometric representation of a metallic ribbing and a TEM in a section of a plastic casing in a sectional height view.
Figure 25:
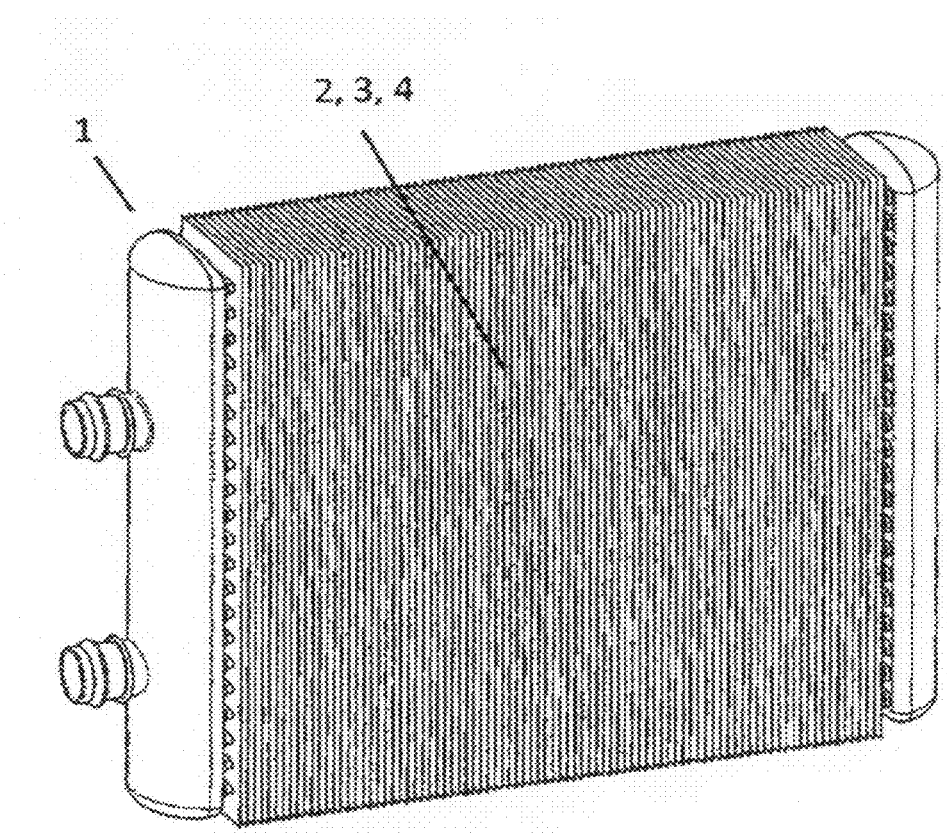
FIG. 25 shows an isometric representation of a TE-HC which includes sheet metal strips as metallic ribbing, and a TEM which has a plastic casing.
Figure 26:
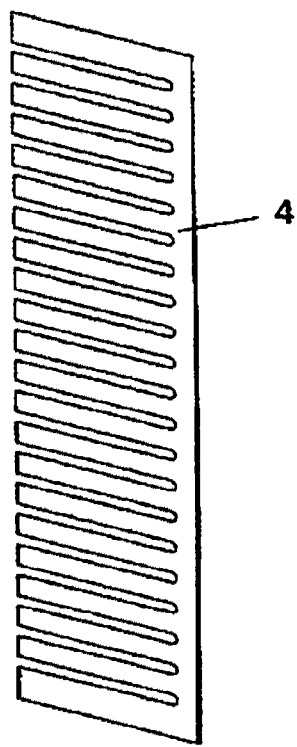
FIG. 26 shows an isometric representation of sheet metal strips as metallic ribbing.

In this specific embodiment, ribbing 4 of plastic casing part 1 of the TEM (as illustrated, for example in FIGS. 22 through 26) is metallic, preferably an aluminum or copper material. Ribbing 4 may be designed according to the publication DE 10 2008 059 737 and be connected to the plastic in the manner illustrated therein. Ribbing 4 is referred to as conducting element 4 in this publication. Instead of the ribbing-tube connection described therein, the present TE-HC invention is aimed at a connection between a ribbing and a casing part 17. The connection mechanisms are thus transferred to the application described herein. Parts of metallic ribbing 4 essentially penetrate plastic casing part 17b, which creates a connection thereto. This approach is illustrated, for example, in FIG. 24. The individual metal ribs, which have corresponding openings and/or convex portions, are illustrated by way of example in FIGS. 22 and 23. FIG. 25 shows an isometric view of a heat exchanger 1 having sheet metal strips as metallic ribbing 4 and TEMs 3 which include plastic casing 17. FIG. 26 shows an isometric representation of a sheet metal strip as metallic ribbing 4.

Ribbing 4 may be assigned to one or two casing parts 17b of one or two TEMs 3. According to the invention, ribbing 4 is preferably assigned to two TEMs 3.

In other embodiment variants of the present invention in the form of TE-HC 1, a metallic casing 17 for TEMs 3 may be used, in particular.

In an embodiment variant of this type, for example, casing 17 of TEM 3 may be made of a two-part or multi-part ceramic-coated metal 19 (e.g., aluminum, copper, high-grade steel). This variant corresponds, in principle to the first embodiment variant described, which was described with reference to FIGS. 11 through 16.

Figure 27:
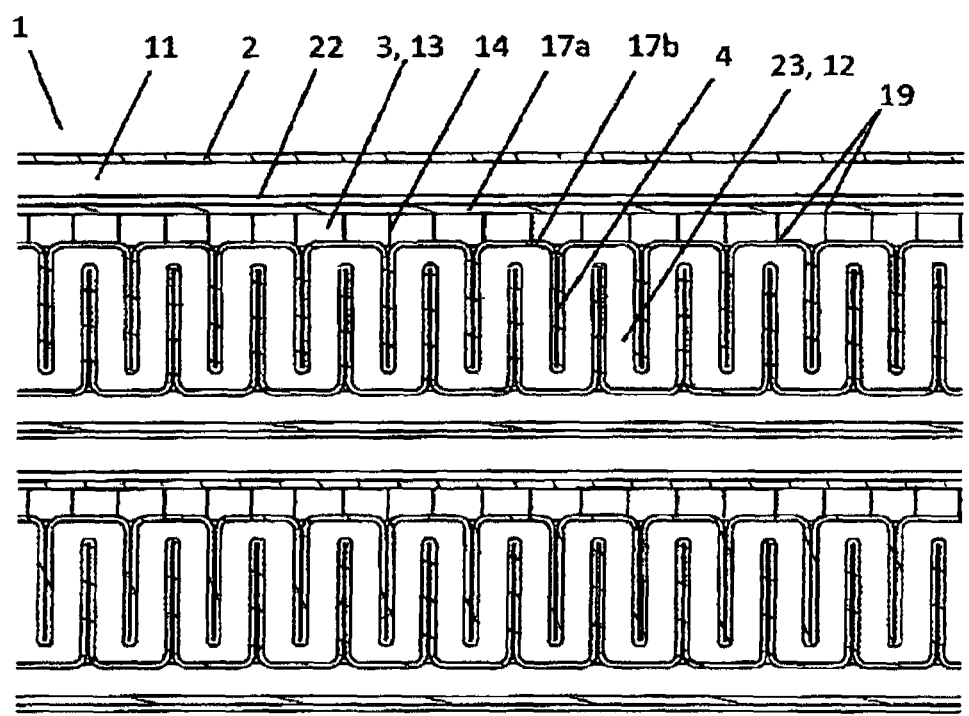
FIG. 27 shows a representation of a section of a TE-HC in a sectional depth view.

In an exemplary embodiment of this type, ribbing 4 of casing part 17 may be introduced into casing part 17 by a forming process (stamping and/or embossing, deep-drawing) if the casing part is a metal sheet. Ribbing 4 may subsequently be compressed so that fewer cavities are produced within 13 TEM 3. An embodiment variant of this type is illustrated, for example, in FIG. 27.

Otherwise, casing part 17 including ribbing 4 could also be designed as a solid part which may be extruded, cast, investment cast, impact-extruded, die-cast or machined, ribbing 4 in this case being already included in casing part 17 without any additional forming steps. This approach would correspond to an embodiment variant illustrated in FIG. 15.

Ribbing 4 may also be soldered onto casing 17, as illustrated in FIG. 21, or be built up without any metallization 25.

Figure 19:
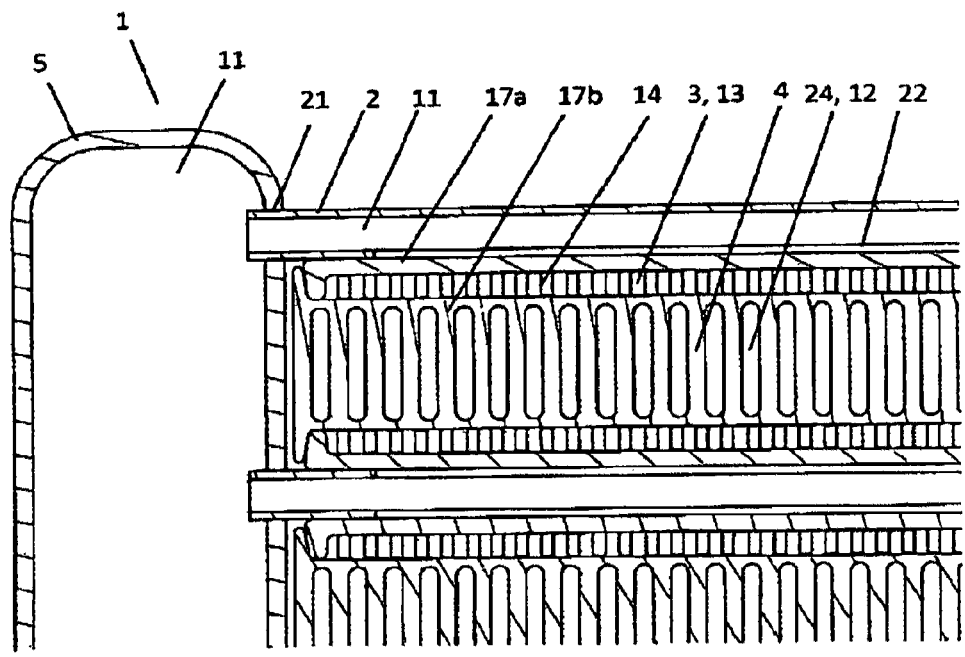
FIG. 19 shows a representation of a section of a TE-HC in a sectional depth view.
Figure 20:
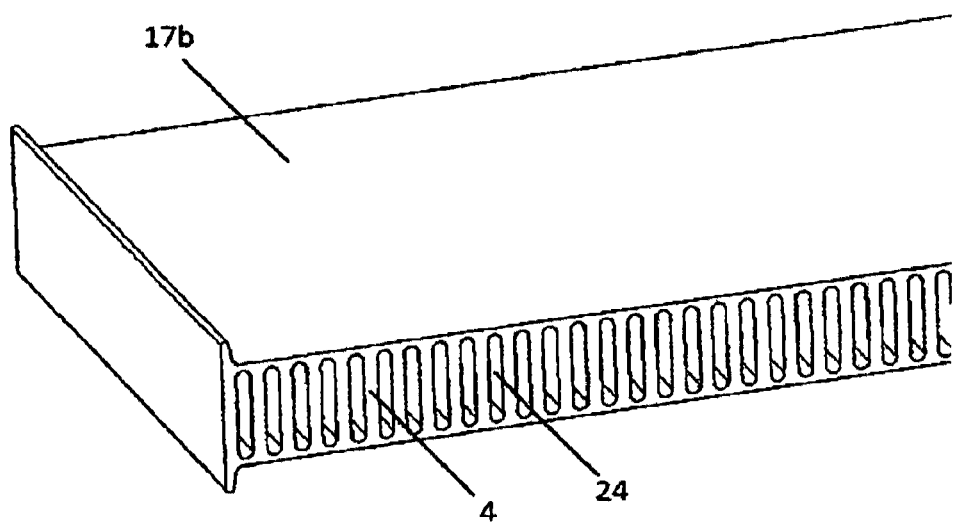
FIG. 20 shows an isometric representation of a section of a second, ribbed main casing part.

In another embodiment variant of the present invention, the casing of TEM 3 may be made of a two-part or multi-part ceramic-coated metal 19 (e.g., aluminum, copper, high-grade steel). In principle, this variant corresponds to the second embodiment variant described above, so that ribbing 4 is assigned two TEMs 3, it being possible to design ribbing 4 as illustrated under the sixth embodiment variant mentioned above. This would correspond to a structure or a similar configuration of components as illustrated in FIG. 19.

In addition to the exemplary embodiments of the present invention described above, additional embodiment variants of TE-HC 1 may also be considered.

Figure 28:
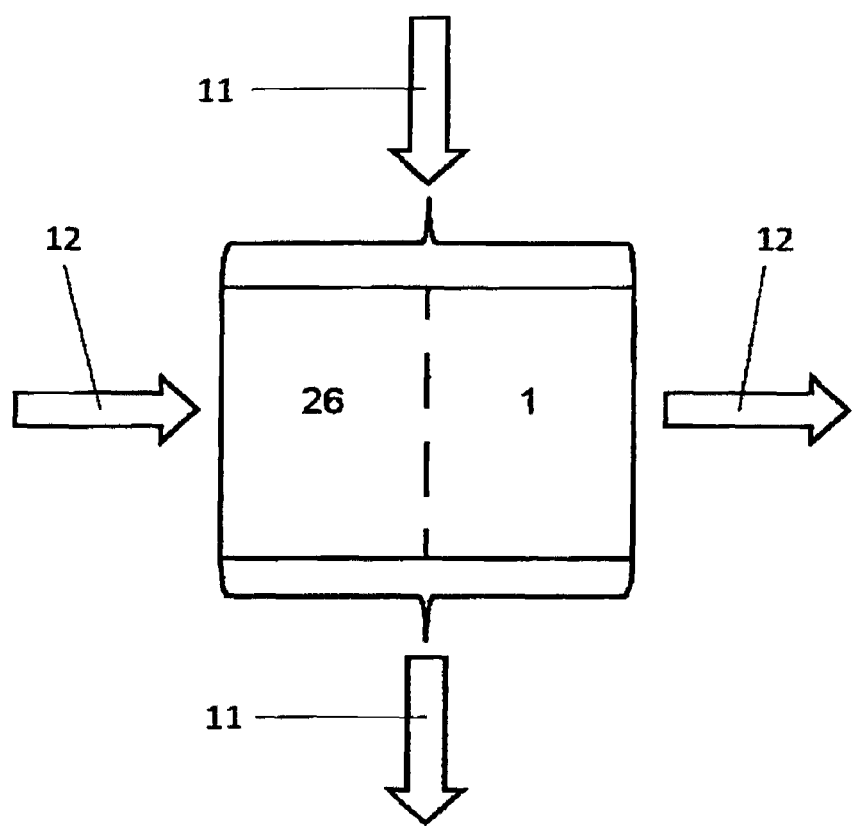
FIG. 28 shows a representation of a schematic configuration of the module components.

For example, a first section, which is not covered by TEMs 3, may be located on tubes 2 in the inlet region of second medium 12 in heat exchanger 1. This approach would correspond to an configuration of components as illustrated in FIG. 28. In this first section, the space in width direction 8 between one tube 2 and tube 2 located therebeneath or thereabove may be filled with ribs 4, ribs 4 being connected to tubes 2. This first section is equivalent to a heat exchanger device 26. TEMs 3 are connected to tubes 2 in the second section. This second section corresponds to TE-HC 1. This approach may be advantageous if first medium 11 is relatively warm and second medium 12 is relatively cold, and second medium 12 is to be heated.

Figure 29:
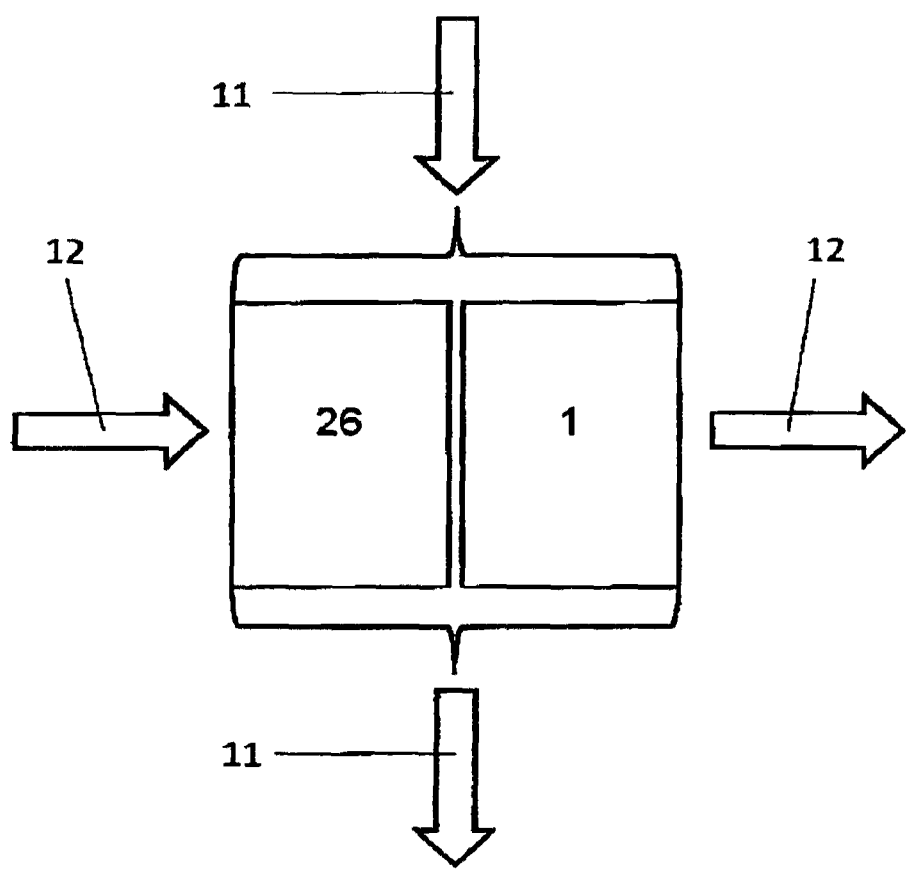
FIG. 29 shows another representation of a schematic configuration of the module components.

In another embodiment variant of the present invention, a tube column/series 2, which is not covered by TEMs 3, may be located in the inlet region of second medium 12 in width direction 8. An embodiment variant of this type is illustrated by way of example in FIG. 29. The space in width direction 8 between one tube 2 and tube 2 located therebeneath or thereabove may be filled with ribs 4, ribs 4 being connected to tubes 2. This first tube row 2 is equivalent to a heat exchanger device 26. A second tube row 2, which is connected to TEMs 3, is connected downstream from first tube row 2. This second tube row 2 corresponds to TE-HC 1. This approach may be advantageous if first medium 11 is relatively warm and second medium 12 is relatively cold, and second medium 12 is to be heated.

In another specific embodiment of the present invention, a PTC heater 27 is integrated into TE-HC 1, according to the embodiment variants described above, PTC heater components 27 being connected downstream from the components of TE-HC 1 in a preferred embodiment, so that the components of TE-HC 1 preheat corresponding medium 11, 12, and PTC heater components 27 further heat medium 11, 12. A configuration of this type is illustrated, for example, in FIG. 31, 32 or 33. In this manner, a thermoelectric heat exchanger is described in which the casing element has a heating region which includes at least one embedded heating element, in particular at least one PTC element, an increase in the temperature of the first medium in the first tube or an increase of the second medium in the fluid channel being enabled in the heating region with the aid of the at least one heating element.

PTC heater components 27 include for example, ceramic PTC elements, metal sheets which are thermally connected to the PTC elements, elements which perform an electric separation between the metal sheets and PTC elements, ribs which are situated between the metal sheets and are connected thereto, and corresponding electric cables and electric insulation of the electric components.

Figure 32:
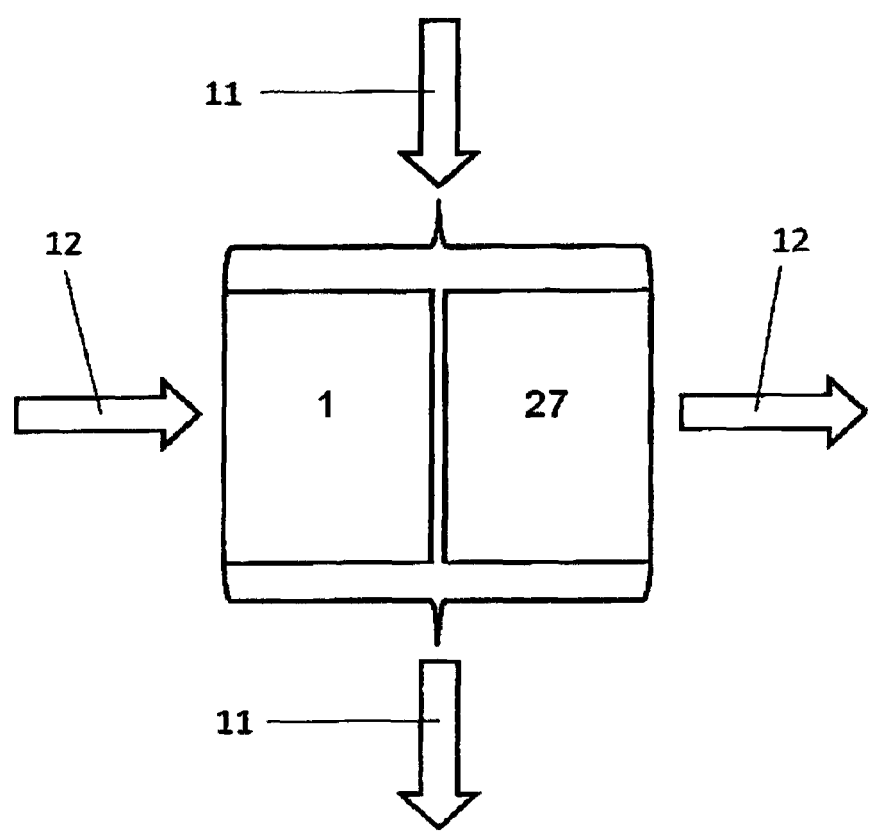
FIG. 32 shows another representation of a schematic configuration of different module components.
Figure 33:
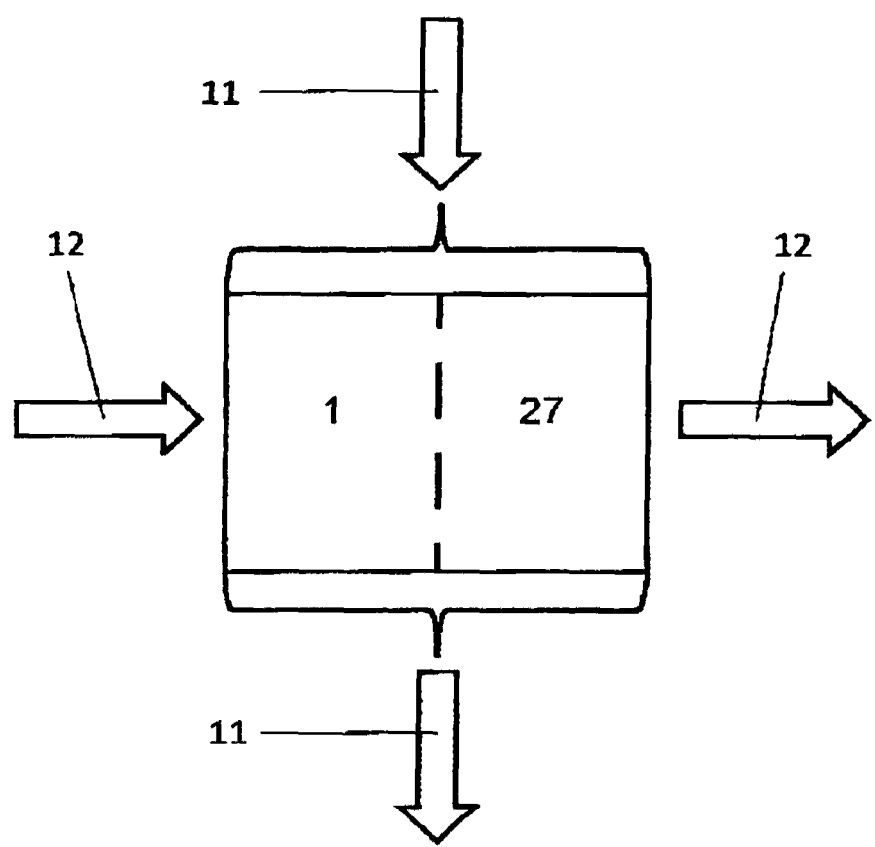
FIG. 33 shows another representation of a schematic configuration of different module components.

PTC heater components 27 may be connected to TE-HC 1. This would apply, in particular to the metal sheets which are connected to collecting tubes 5 of TE-HC 1. However, PTC heater components 27 may also be accommodated in a separate component, PTC heater 2, as illustrated in FIG. 32, no direct connection to TE-HC 1 existing in this case. TE-HC 1 and PTC heater 27 may be accommodated in a common housing in this case. Both embodiments thus represent an integration of PTC heater 27 into TE-HC 1.

Figure 30:
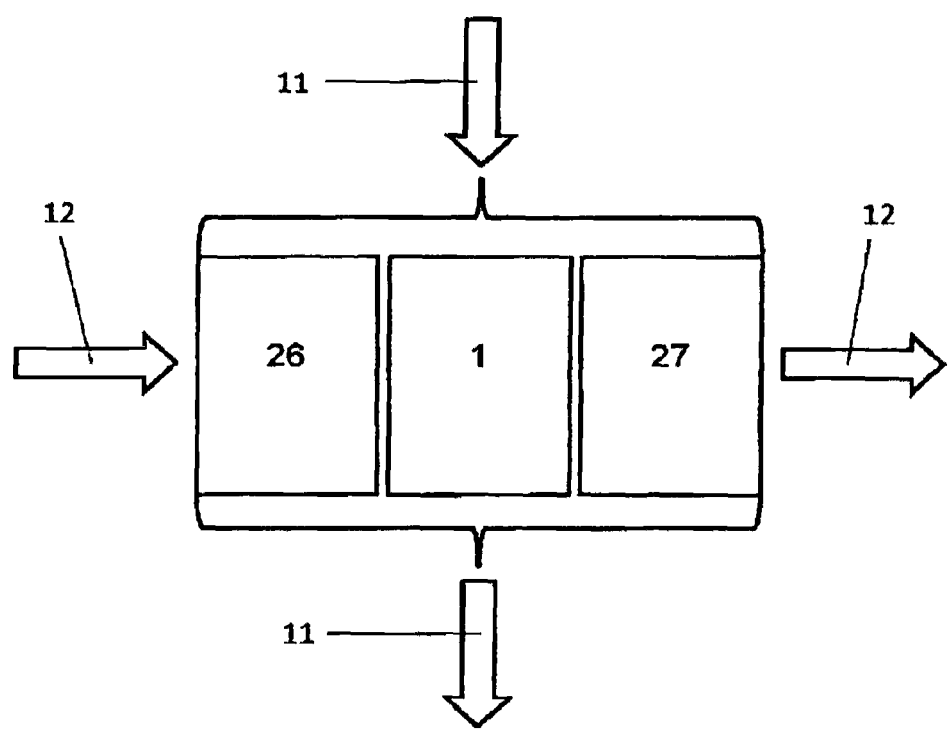
FIG. 30 shows another representation of a schematic configuration of different module components.
Figure 31:
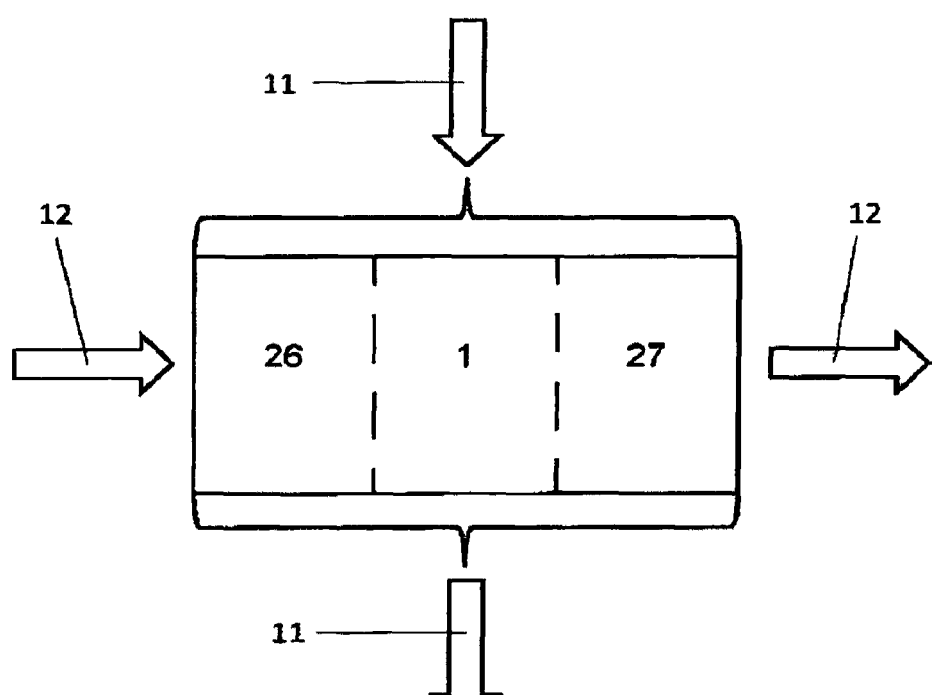
FIG. 31 shows another representation of a schematic configuration of different module components.

A combination of the embodiment variants described above may also be considered, in which a heat exchanger device 26 first permits a temperature equalization of the temperatures of the first and second media, after which the components of TE-HC 1 act upon the corresponding medium and finally the corresponding medium to be heated is heated by a heater stage 27. Embodiment variants of this type are shown in FIGS. 30 and 31, a configuration in which the individual elements are formed as separate units being shown in FIG. 30, and a configuration in which the units described above are integrated into a standard and compact thermoelectric heat exchanger without any separating elements being shown in FIG. 31.

In other preferred specific embodiments, a flow involving the first medium may pass through the devices in FIGS. 28 through 33 via a bypass channel in such a way that first medium 11 is applied to either region 1 and/or region 26 and/or region 27.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermoelectric heat exchanger for heating or cooling a medium, the thermoelectric heat exchanger comprising:
at least one first tube configured to carry a first medium;
at least one second tube configured to carry the first medium, the second tube being arranged substantially parallel to the first tube;
a casing element that is disposed between the first tube and the second tube, the casing element comprising a first casing part that is connectable to the first tube and at least one second casing part that forms a fluid channel for a second medium; and
a thermoelectric element for heating or cooling the first medium or the second medium, the thermoelectric element being disposed between the first casing part and the second casing part, the thermoelectric element being sealed fluid-tight against the first medium and/or the second medium via the casing element,
wherein the second casing part has a ribbing that is manufactured from a metallic material, and
wherein the ribbing has upward bends that are embedded into another material of the second casing part.

2. The thermoelectric heat exchanger according to claim 1, wherein the second casing part has a plurality of openings, which form the fluid channel for the second medium.

3. The thermoelectric heat exchanger according to claim 1, wherein the first tube has at least one recess that permits direct contact between the first medium and the first casing part when the first medium flows through the first tube.

4. The thermoelectric heat exchanger according to claim 1, wherein the casing element has a third casing part that is connectable to the second tube, wherein another thermoelectric element is disposed between the third casing part and the second casing part, and wherein the additional thermoelectric element is sealed fluid-tight against the first medium and the second medium.

5. The thermoelectric heat exchanger according to claim 1, wherein the casing element has at least one casing part that is made of a ceramic material and/or has a coating that includes a ceramic material.

6. The thermoelectric heat exchanger according to claim 1, wherein at least one of the first casing part or the second casing part is manufactured from a plastic material.

7. The thermoelectric heat exchanger according to claim 1, wherein the casing element has a heat exchange region in which an exchange of heat between the first medium and the second medium is enabled without intervention by the thermoelectric element.

8. The thermoelectric heat exchanger according to claim 2, wherein the plurality of openings are oblong holes.

* * * * *